No. 817,730. PATENTED APR. 10, 1906.
H. A. WILLIAMS.
ELECTRICAL FRICTION CLUTCH.
APPLICATION FILED OCT. 22, 1904.
2 SHEETS—SHEET 1.
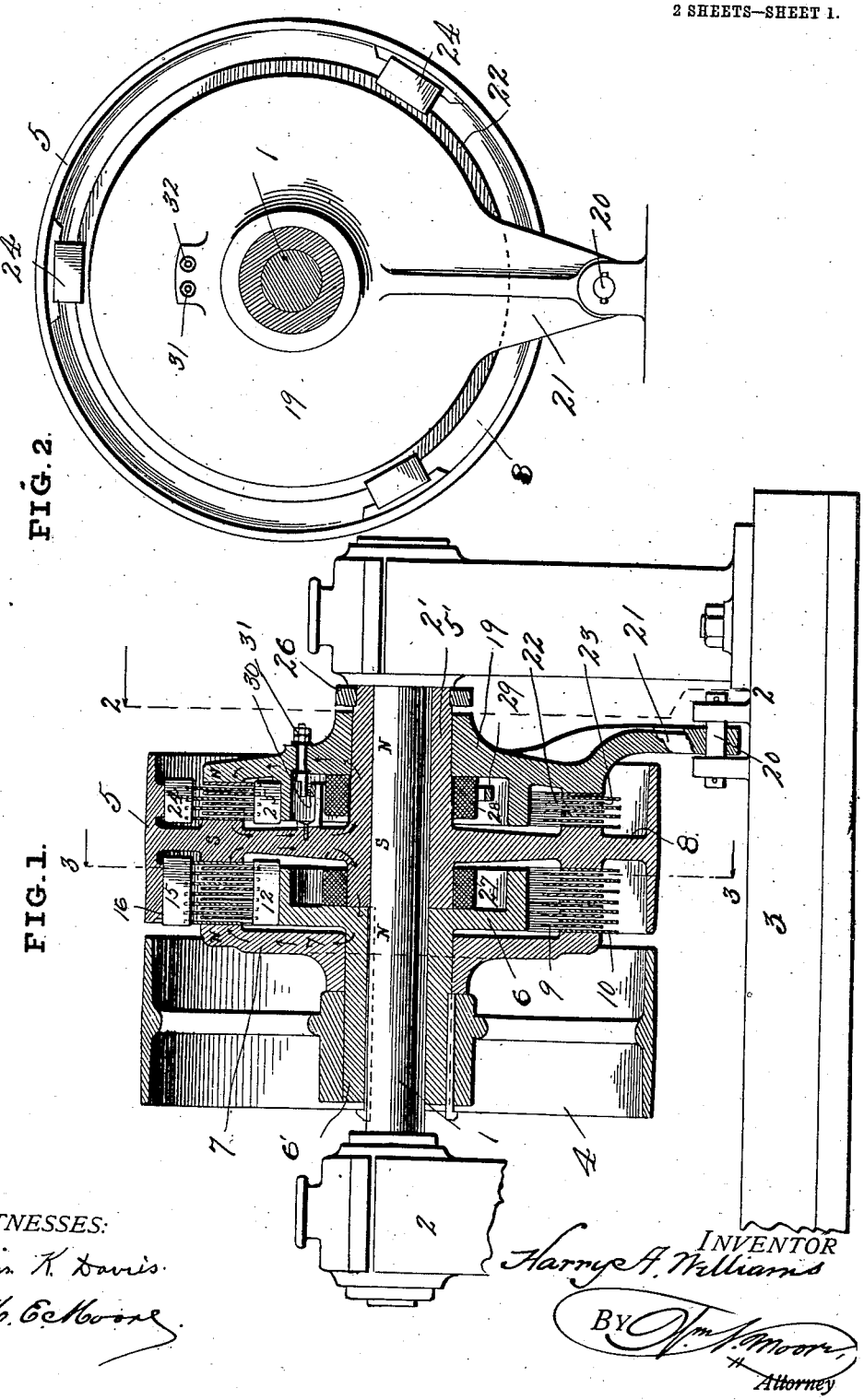
WITNESSES:
Chas. K. Davis.
M. E. Moore
INVENTOR
Harry A. Williams
By Wm. S. Moore,
Attorney No. 817,730. PATENTED APR. 10, 1906.
H. A. WILLIAMS.
ELECTRICAL FRICTION CLUTCH.
APPLICATION FILED OCT. 22, 1904.
2 SHEETS—SHEET 2.
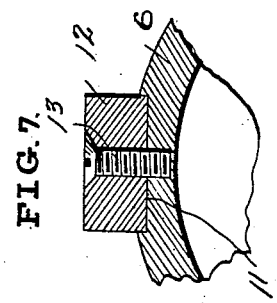
FIG. 7.
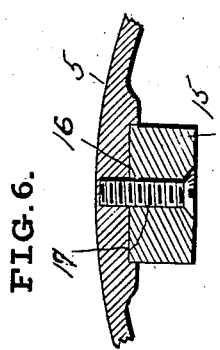
FIG. 6.
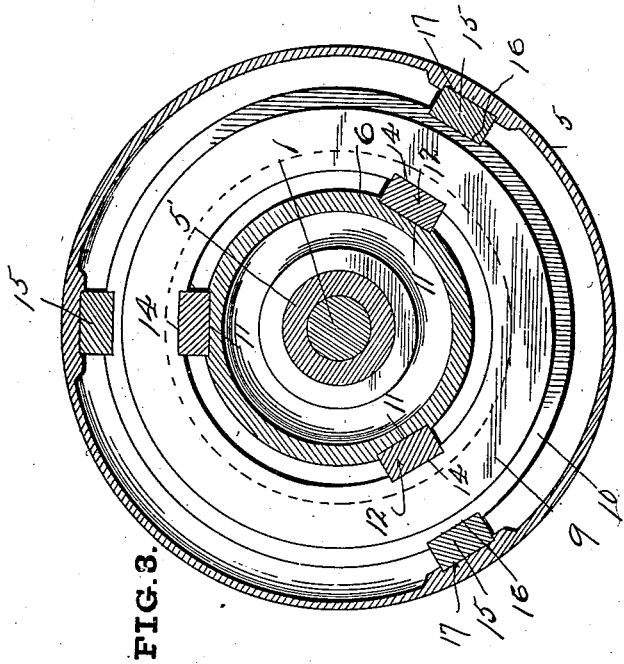
FIG. 3.
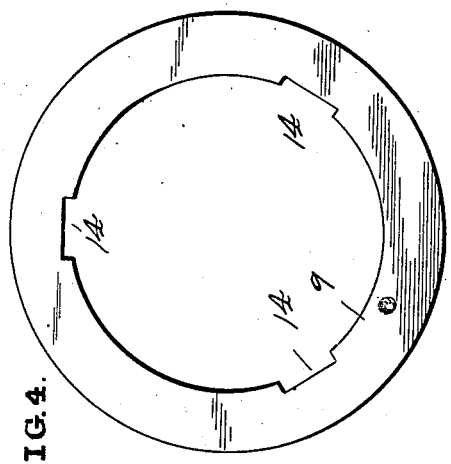
FIG. 4.
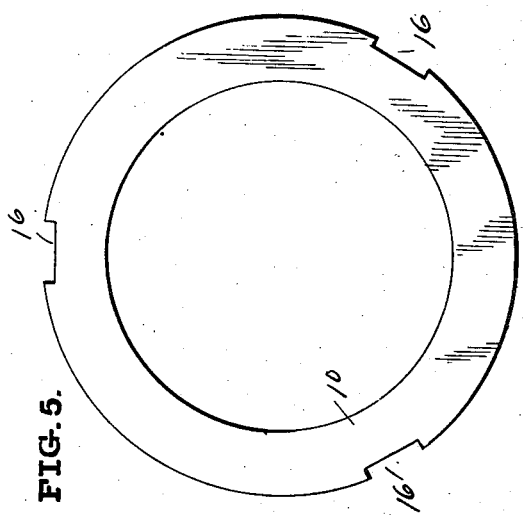
FIG. 5.
WITNESSES:
Chas. K. Davis
M. E. Moore
INVENTOR
Harry A. Williams.
BY 
Attorney

UNITED STATES PATENT OFFICE.

HARRY A. WILLIAMS, OF AKRON, OHIO.

ELECTRICAL FRICTION-CLUTCH.

No. 817,730.      Specification of Letters Patent.      Patented April 10, 1906.

Application filed October 22, 1904. Serial No. 229,522.

*To all whom it may concern:*

Be it known that I, HARRY A. WILLIAMS, a citizen of the United States, residing at Akron, in the county of Summit and State of Ohio, have invented certain new and useful Improvements in Electrical Friction-Clutches, of which the following is a specification.

My invention relates to improvements in electrical friction-clutches, and has for its object the provision of an electrical friction-clutch mechanism operated electrically by which a driving-pulley located on a shaft and moving therewith may be brought into operative connection with and drive a second or driven pulley located loosely on said shaft for driving from a shaft to a machine or to revolve another shaft.

Another object is to provide a clutch-brake to be used in connection with said clutch mechanism, which brake in case of accident will immediately and effectively, but without shock or jar, stop the rotation of the driven pulley by closing an electric circuit.

The invention consists, essentially, of a driving and a driven pulley, each having a series of metallic plates connected thereto, said plates being arranged in position so that they may be brought into frictional contact by magnetism induced by a current of electricity passing through them, thus frictionally connecting the two members of the clutch mechanism so they will rotate together on a single shaft; and the invention further consists, in the combination, with such clutch mechanism, of a brake mechanism connected in a similar manner to the driven pulley and operated electrically to stop the rotation of said pulley.

The invention also consists in certain other novel features of construction and combinations and arrangements of parts, as will be hereinafter described and claimed.

In the drawings, Figure 1 is a vertical sectional view of a clutch mechanism embodying the features of my invention. Fig. 2 is a view taken on line 2 2, Fig. 1. Fig. 3 is a sectional view taken on line 3 3, Fig. 1. Fig. 4 is a plan view of one of a series of frictional contact rings or plates used to carry out the invention. Fig. 5 is a view, similar to Fig. 4, of one of another series of contact rings or plates. Fig. 6 is an enlarged sectional detail view showing manner of securing the retaining-block for one set of rings to the driven member of the clutch, and Fig. 7 is a view showing manner of fastening the retaining-blocks of another series of rings to the driving member of the clutch mechanism.

Referring to the drawings, the numeral 1 indicates a shaft journaled in suitable bearings 2 2', located on the bed-plate 3. Shaft 1 carries the driving-pulley 4 and driven pulley 5. A driving-disk 6, having an elongated hub 6', is keyed to shaft 1, and the hub of pulley 4 is keyed to hub 6', the pulley 4, disk 6, and shaft 1 being thus connected to rotate together. A member, which I term a "pressure-disk," as 7, has its hub surrounding the hub 6', and said disk 7 is capable of lateral motion on hub 6' between the hub of the pulley 4 and driving-disk 6.

Located between the pressure-disk 7 and the central plate 8 of the wheel 5 are two series of disk rings or friction-plates 9 and 10. These two series are of different diameter, the rings 9 being smaller than rings 10 and connected so that the rings 10 may revolve around the rings 9 when the clutch is disengaged. The rings 9 and 10 are interposed alternately between the pressure-disk 7 and the central plate 8 of the pulley or wheel 5. These series of plates or rings are conductors of magnetism, having a different metallic structure, which reduces the wear of the parts, the series 9 being made of charcoal-iron and the series 10 composed of rings of mild steel. By test I have found that these two metals give the best results, and being durable and effective in frictional contact I prefer their use in the clutch.

The rings 9 are connected to and rotate with disk 6. Said disk has a suitable number of recesses 11 cut therein to receive the disk plate or ring-retaining blocks 12, and said blocks are non-conductors of magnetism (hard bronze is preferred) and are securely fastened to the driving-disk by screws 13. The rings 9 have a corresponding number of recesses 14 in the interior periphery of the rings, by means of which said rings may be pushed into position on the ring or disk 6, the ring-recesses 14 fitting over the retaining-blocks 12 with a neat but sliding fit in order that the rings may have a lateral movement on the driving-disk 6.

The disk rings 10 are connected to the driven pulley 5 by means of retaining-blocks 15 and recesses 16, located on the outer periphery of the rings. The blocks 15 are secured in the recesses 17 of the pulley 5 by screws 18. These blocks 15 and recesses 16 are also three in number, and the recesses fit over the blocks with a sliding fit.

In assembling the series of rings a ring 10 is first slipped over its retaining-blocks 15. Then a ring 9 is slipped over blocks 12, and another ring 10 is placed in position, followed by a second ring 9, thus alternating a small and a larger ring to the desired number, the rings being in position adjacent one another, but out of contact, when the clutch is out of engagement. It will be noticed that the pressure-disk 7 is capable of a lateral-sliding motion on the hub 6' of the driving-disk 6.

In connection with the driven pulley 5 I employ an electrically-operated brake mechanism similar in operation to the electric pulley-driving mechanism, except that the pressure-disk 19 of the braking mechanism is non-rotatable, being anchored to the bed-plate 2 by pin 20, passed through the arm 21 of the disk, and lugs on the bed-plate. The series of rings 22 23 are held to the pulley 5 and pressure-disk 19 by retaining-blocks 24 and 25, respectively, the series 22 rotating with pulley 5 and the series 23 remaining stationary with pressure-disk 19. The pressure-disk 19 is permitted to move laterally on the hub 5' of the pulley 5, said movement being limited by the ring or collar 26.

Two magnets 27 and 28 and the commutator-ring 29 are employed, connection being made by the brush 30 and poles 31 and 32 to complete the circuits, one for energizing the clutch mechanism and the other circuit for energizing the brake mechanism.

The clutch is energized by a magnetic circuit, (indicated by the arrows on disk 6 and pulley 5,) and the brake mechanism is operated by a switch to change the current from the clutch-circuit to the brake-circuit, as indicated by arrows in pulley 5 and disk 19, both circuits being completed from the same poles 31 and 32. It will be understood, of course, that while one mechanism is energized by being in circuit the other mechanism is not affected and is out of circuit.

In operation, assuming the shaft 1 to be rotating, and with it driving-pulley 4, driving-disk 6, pressure-disk 7, and rings 10, and the pulley 5, idle, in order to engage the clutch and drive pulley 5 the clutch-circuit is closed. The magnet 27 attracts disk 7, which slides on the hub 6' toward pulley 5. Disk 7 slides the rings 10 and 9 against each other—that is, the recesses 16 and 14 glide over the retaining-blocks 15 and 12, respectively, until all the rings are in frictional contact in a row between disk 7 and plate 8 of the pulley 5. As the rings gradually come into closer contact the friction increases, the idle rings 9 are started rotating and gradually attain speed, carrying with them the pulley 5. To disengage the clutch mechanism and stop the rotation of pulley 5 instantaneously, the clutch-circuit is broken and the brake-circuit is closed. This demagnetizes the clutch-circuit and magnetizes the brake-circuit, thus throwing the clutch-rings out and throwing in the brake-rings. The pressure-disk 19 having the stationary rings 23, the friction between said rings and rotatable rings 22 causes rings 22 and pulley 5, to which they are attached, to come to rest, thus stopping the pulley 5, but permitting the driving-pulley 4 to run freely. By the gradual frictional contact obtained in the clutch-rings and brake-rings the driven wheel may be started rapidly without shock or jar, and the same wheel may be stopped quickly without shock, thus providing a very efficient and desirable starting and stopping mechanism. It will be observed that in this construction no adjustment mechanism is necessary for the parts, as the wear on the rings will adapt the rings to continuous use without adjustment, and the electrical frictional contact between the rings will hold said rings rigid and drive the driven pulley as long as the current continues.

While I have shown only one physical embodiment of the features of my invention, I do not limit myself to this specific structure, as changes, alterations, and substitutions may be made without departing from the scope of my claims.

Having thus fully described my invention, what I claim as new, and desire to secure by Letters Patent, is—

1. The combination of a shaft, a driving-pulley, a driving-disk having an elongated hub and carrying non-magnetic retaining-blocks, a series of recessed contact-rings engaging said blocks, and a pressure-disk movable on said elongated hub adapted to bear against said rings; with a driven pulley carrying non-magnetic retaining-blocks, a series of recessed contact-rings engaging said blocks, said series of rings forming part of a magnetic circuit, and electrical connections whereby said pressure-disk is moved to press the contact-rings into frictional contact to drive the driven pulley.

2. The combination of a shaft carrying a driving-pulley and driving-disk, contact-rings carried by said disk, a driven pulley carrying retaining-blocks of non-magnetic material, a pressure-disk, a series of recessed rings to engage said blocks and arranged alternately between said driving-rings, said series of rings forming part of a magnetic flux, and electrical connections whereby said pressure-disk is moved to press said rings into frictional contact.

3. The combination of a shaft carrying a driving-disk provided with retaining-blocks of non-magnetic material, a series of recessed rings to engage said blocks, a pressure-disk, a driven pulley carrying retaining-blocks, a series of recessed rings engaging said blocks, said series of rings forming part of a magnetic flux, and electrical connections whereby the pressure-disk brings the rings into frictional contact.

4. A shaft and driving-disk, retaining-blocks of non-magnetic material on the disk and a series of recessed rings engaged by said blocks, said rings forming part of a magnetic flux, a pressure-disk, and a magnet carried by the driving-disk, combined with a driven pulley carrying non-magnetic retaining-blocks, a series of recessed rings engaging said blocks, a commutator on the driven pulley, and electrical connections to bring the rings into frictional contact.

5. In a clutch, a shaft, a driving-pulley carrying contact-plates, a driven pulley carrying contact-plates, combined with brake mechanism having contact-plates, contact-plates on the driven pulley adapted to frictionally engage with said brake contact-plates, and an electrical circuit with a switch therein to change the magnetic flux from the clutch-circuit to the brake-circuit.

6. In a clutch, a shaft, a driving-pulley rotatable thereon carrying contact-plates, a driven pulley carrying contact-plates adapted to frictionally engage said driving-plates, combined with a movable non-rotatable pressure member carrying contact-plates, contact-plates carried by the driven pulley adapted to contact with the last-mentioned or brake plates, and an electrical circuit with a switch therein to change the current from the clutch-circuit to the brake-circuit.

7. In a clutch, a shaft, a driving-pulley carrying contact-plates, a driven pulley carrying contact-plates adjacent said driving-plates combined with a movable non-rotatable pressure-disk having retaining-blocks and contact recessed rings to engage said blocks, contact-plates carried by the driven pulley adapted to engage with said last-mentioned plates, and an electrical circuit with a switch therein to change the current from the clutch-circuit to the last-mentioned series of rings.

8. In a clutch, the combination with a driven pulley carrying two series of contact-rings, a driving-pulley carrying a series of rings adapted to frictionally engage one of said series, a non-rotatable brake member having contact-rings to engage the rings of the other series and electric connections with a switch therein to change the current from the clutch-circuit to the brake-circuit.

9. In a clutch, the combination with a driven pulley carrying two series of contact-rings and a commutator, a driving-pulley carrying a magnet and a series of rings adapted to frictionally contact with one of said series, a non-rotatable brake member having a magnet and contact-rings adapted to engage the other series of rings on the driven pulley, and electrical connections with a switch therein to change the current from the clutch-circuit to the brake-circuit, whereby the clutch may be driven or the said clutch disengaged and the brake engaged.

In testimony whereof I affix my signature in presence of two witnesses.

HARRY A. WILLIAMS.

Witnesses:
JOHN R. VAUGHAN,
RAYMOND E. LEWIS.